Patented Apr. 15, 1930

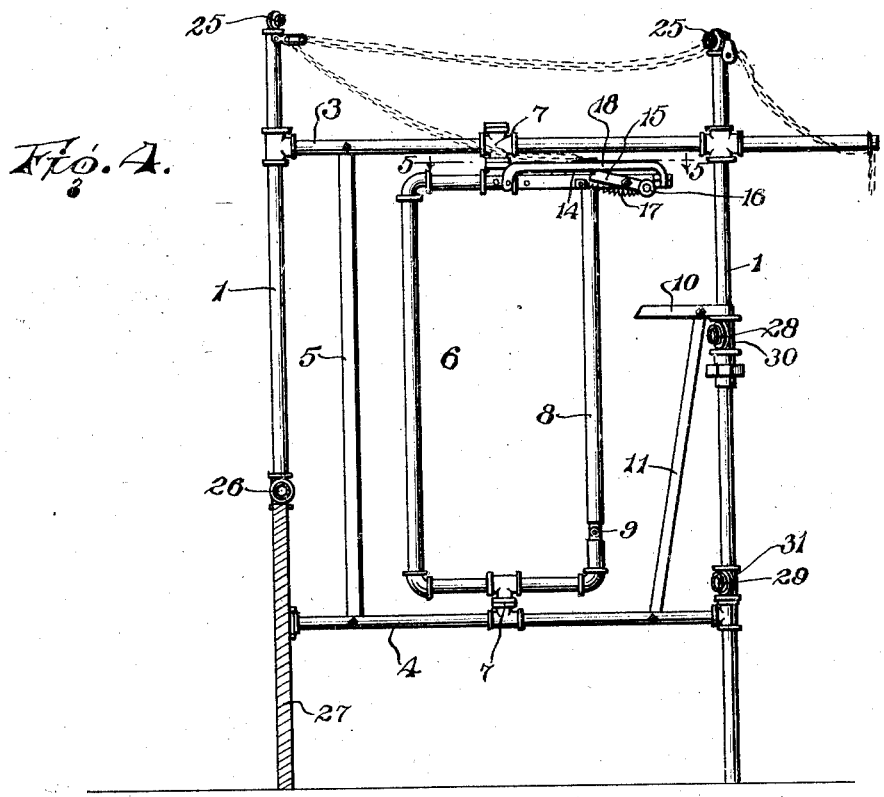

1,754,752

UNITED STATES PATENT OFFICE

JAMES F. GRIM, OF COMSTOCK, NEBRASKA, ASSIGNOR OF ONE-HALF TO LOUIE E. GRIM, OF COMSTOCK, NEBRASKA

COW STALL

Application filed August 10, 1926. Serial No. 128,439.

This invention relates to cow stalls and has for its object the provision of means whereby a cow may be so confined in a stall that she will be prevented from kicking while being milked. The invention also has for its object the provision of means for the stated purpose which will not discommode the cow and which may be very easily adjusted to permit the cow to enter the stall or set in such position that injury to persons passing near an occupied stall will be prevented. These stated objects, and other objects which will incidentally appear in the course of the following description, are attained in such an apparatus as is illustrated in the accompanying drawings, and the invention resides in certain novel features which will be particularly pointed out in the appended claims.

In the drawings:

Fig. 4 is a vertical section on the line 4—4 of Fig. 1.

Figure 1:
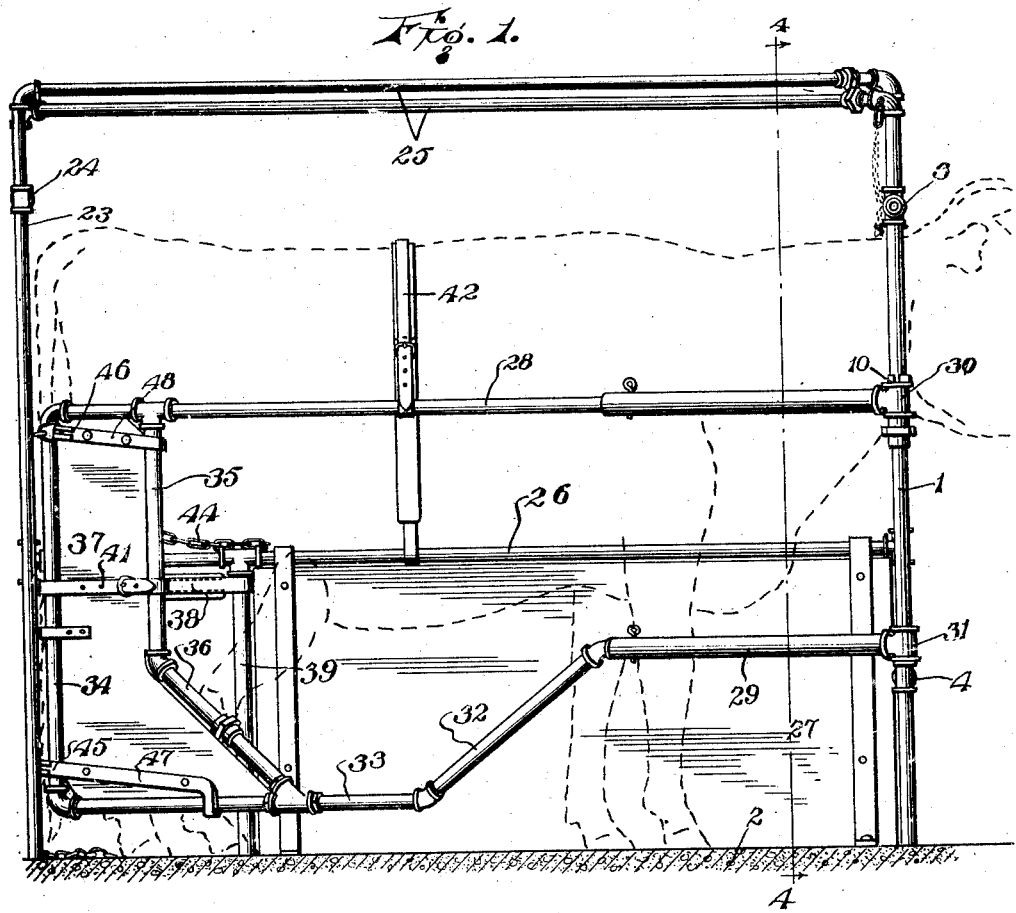
Figure 1 is a side elevation of my improved stall arranged for use.

A stall embodying my invention includes a stanchion frame comprising posts 1 which are set up at a proper distance apart and may be anchored in any convenient manner. In Fig. 1, I have indicated the stall as having a concrete floor 2 in which the lower ends of the posts 1 are embedded. Near their upper ends, the posts are connected by a cross bar 3 and near their lower ends they are connected by a similar bar 4, a vertical brace 5 being secured to and extending between the said cross bars near that side of the stall which will, for convenience, be referred to as the off side. The stanchion, indicated as an entirety by the numeral 6, is supported by and between the cross bars 3 and 4 by swiveled couplings 7 permitting the stanchion to rock in a horizontal plane in a well known manner. The stanchion comprises a rocking side bar 8 which is pivoted at its lower end, as indicated at 9, and is movable to permit the animal's head to be inserted through the stanchion and then secured so as to prevent the withdrawal of the animal, all said parts being well known in the art. The upper end of the bar 8 is retained in its closed position by a latch mechanism which is preferably of the construction disclosed in Letters Patent, No. 1,724,651, granted to me August 13, 1929.

At the rear or entrance end of the stall, posts 23 are erected, and these posts are connected near their upper ends by a cross bar 24. They are shown as connected also at their upper ends to diagonally disposed braces 25 which extend to the front posts 1 and are connected to the upper ends thereof. These diagonal braces may be omitted, however, but are advantageous where there is only a single stall and the posts are not set in concrete. At the off side of the stall, a longitudinal connecting bar 26 is secured to and extends between the respective posts 1 and 23 at a proper height to serve as a barrier against side movements of the animal. A board 27 is connected to this longitudinal bar 26 and serves as a closure for the off side of the stall. Upon reference to Figs. 2 and 3, it will be noted that the cross bar 24 is appreciably longer than the upper cross bar 3 and there is a corresponding difference in the lengths of the diagonal braces 25, this arrangement providing a space at the near side of the stall in which the milker may be seated so as to easily reach to the animal when milking her, and without being crowded by an adjacent stall. The arrangement also permits the gate to be fully opened without interference with an adjacent stall. It may be noted at this point that the members of the frame are preferably tubing and are connected by ordinary elbows or T-couplings, thus facilitating the assembling of the parts and the erection of the stall while at the same time providing a very strong and durable structure.

The closure for the near side of the stall is provided by a gate consisting essentially of an upper bar 28 and a lower bar 29 which are hingedly supported at 30 and 31, respectively, upon the near front post 1 whereby the gate may be swung in a horizontal plane, for purposes which will presently appear. The bars 28 and 29 are preferably each composed of two telescopically connected members, as clearly shown in Fig. 1, whereby they may be adjusted in length to meet varying conditions and accommodate the structure to the size of the animal as well as to the convenience of the operator. The lower gate bar 29 has an intermediate portion 32 which extends downwardly and rearwardly so that toward the rear of the stall the gate will be increased in its vertical dimension and the space between the upper and lower swinging bars will be enlarged to readily accommodate the arms of the milker while at the same time the forward portion of the lower gate bar will be so disposed as to restrain the forelegs of the animal and prevent them being swung against the operator to his discomfort and inconvenience. This is clearly shown in Fig. 1 of the drawings. From the lower end of the intermediate inclined portion 32 of the lower gate bar, a rear portion 33 extends horizontally and has its rear end connected by a corner bar 34 with the rear end of the upper gate bar 28, and in advance of the rear end of the gate a bar 35 is secured to the upper bar 28 to depend therefrom and be secured to a forwardly and downwardly inclined bar 36 which extends to and is secured to the rear portion 33 of the lower gate bar. Between the bars 35 and 36 and the bar 34 is secured a closing plate 37 which may be of wood or metal as preferred and will be disposed immediately against the rear leg of the animal when the device is in use, as indicated in Fig. 1. The operator is thereby protected against any movement of the animal's rear leg. A strap 38 is attached at one end to an intermediate post 39 supporting the rear portion of the side bar 26 and passes therefrom to the bar 34 to which it may be fastened. This strap is preferably of canvas and provided with rings 40 at its ends to which are attached straps 41, said straps being passed around the post 34 and fastened to the post 35 to hold the strap 38 across the front of the animal's rear legs. To further aid in securing the animal in the stall, a back strap 42 is attached at one end to the side bar 26 and extends therefrom to the bar 28 so that it may be passed over the back of the animal, as indicated in Fig. 1, and fastened to restrain all movement of the animal. It will also be readily noted that the straps just described prevent the gate swinging just away from the animal so that, while the milking is in process, the animal will be properly confined and disturbance of the operator cannot occur.

Figure 2:
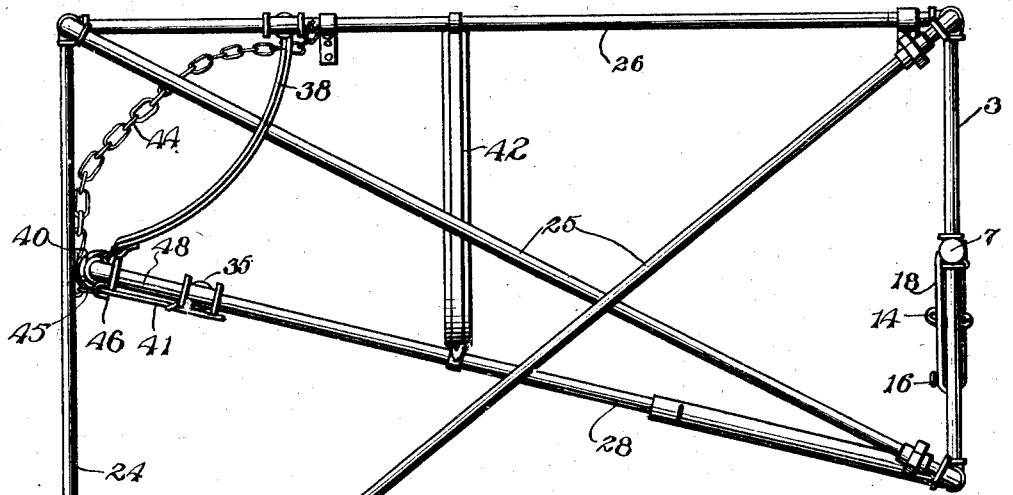
Figs. 2 and 3 are top plan views of the stall showing different adjustments of the same.
Figure 3:
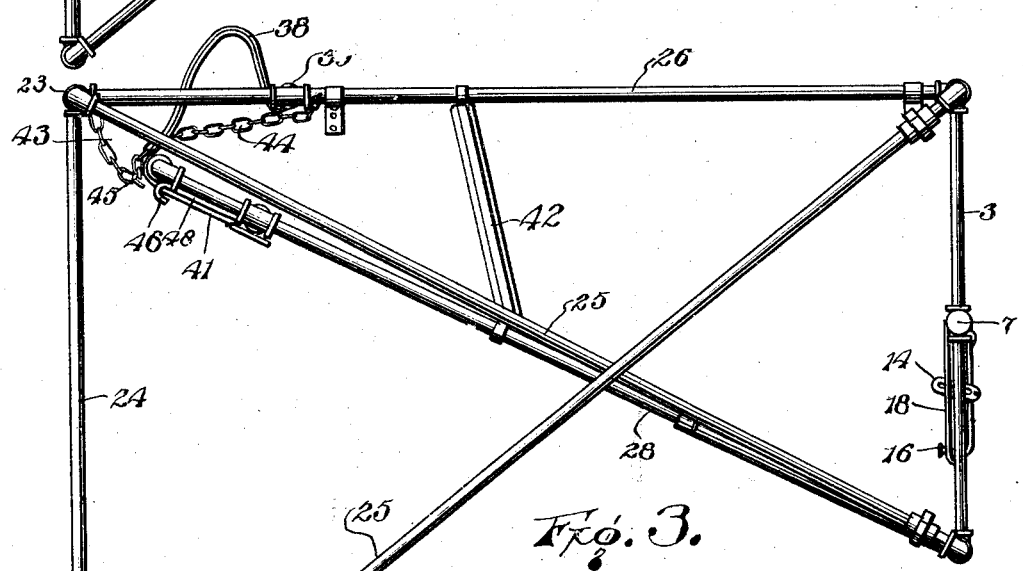

The position of the parts illustrated in Fig. 2 is that in which they are set during the milking operation. When an animal is to be driven into the stall, the straps 38 and 42 are, of course, released so that they will not impede the entrance of the animal and the gate is then swung to a position approximately parallel with the side bar 26 or in divergent relation thereto so that the rear end of the stall will be fully opened and the animal may readily pass thereinto, the cross bars 3 and 24 being, of course, located at the proper height to provide ample clearance. When the stall is not in use and is not to be occupied for sometime, the gate is swung to the position shown in Fig. 3, in which it converges sharply toward the side bar 26 and has its rear end disposed close to said side bar. It is secured in this position by chains 43 and 44 attached, respectively, to the rear off post 23 and to the side bar 26 adjacent the post 39. These chains are engageable in forked hooks 45 and 46 formed on the rear ends of metal straps 47 and 48 which are extended across the plate 37 adjacent its lower and upper ends, as shown clearly in Fig. 1. The links of the chains may readily pass through the notches of the respective hooks and engage behind the claws or fingers thereof so that the gate will be effectually held in its closed position illustrated in Fig. 3. When thus held, the gate cannot swing outwardly to be damaged by chance blows nor to inflict injury on persons who may be working near the stall or passing the same. The chain 44 is also utilized to restrain the cow by being passed back of her rear legs when the parts are in the position shown in Fig. 2.

From the foregoing description, taken in connection with the accompanying drawings, it will be seen that I have provided an exceedingly simple structure which may be readily embodied in any stall and by the use of which a cow will be effectually restrained from all kicking movements while being milked so that the milking operation may proceed expeditiously and possible injury to the operator and loss of milk will be avoided. It will also be noted that except for the members 27 and 37, the stall is of open or skeleton formation throughout so that there is ample ventilation and the animal is not irritated by a feeling of confinement, the comfort of both the animal and the milker being promoted.

Having thus described the invention, I claim:

1. An apparatus for the purpose set forth comprising an open frame consisting of a pair of fixed front posts, a pair of fixed rear posts, the rear posts being spaced apart a greater distance than the front posts, cross bars rigidly connecting the front posts, a cross bar rigidly connecting the rear posts near their upper ends, diagonally disposed braces rigidly connecting the upper ends of the front and rear posts, a side bar rigidly connecting the front and rear posts at one side of the frame and located at an intermediate point in the height thereof, and a gate forming a closure for the opposite side of the frame and mounted upon the front post at the said side, said gate extending the full length of the frame and means whereby the rear free end of the gate may be held to said side bar or at a set distance therefrom.

2. A cow stall comprising pairs of fixed posts, rigid connections between the posts producing a skeleton frame, means carried by the posts at one end of the frame to hold an animal's head, the posts at the opposite end of the frame being so disposed as to admit an animal, a rigid side bar connecting the posts at one side of the frame and preventing egress of the animal at said side, a gate forming a closure for the opposite side of the frame and mounted for swinging movement toward and from said side bar, said gate consisting of an upper bar arranged to extend at the side of the body of an animal, a lower bar having its forward portion arranged to extend beside the animal's foreleg, its intermediate portion inclined downwardly and rearwardly and its rear portion extending horizontally from said inclined portion, a corner bar connecting the rear ends of the upper bar and the lower bar, a connection between said bars in advance of their rear ends, the lower portion of said connection being inclined downwardly and forwardly, and a plate secured to and closing the space between said connection, the corner bar and the upper and lower bars, and flexible elements to connect the side bars and the rear free end of the gate and passed in front and in rear of the animal's rear legs whereby to confine the animal and prevent kicking.

3. A cow stall comprising a skeleton frame including spaced posts, a rigid horizontal side bar connecting the posts at one side of the frame and preventing egress of an animal at said side, a gate forming a closure for the opposite side of the frame and movable toward and from said side bar, said gate consisting of an upper bar arranged to extend at the side of an animal's body, a lower bar having its forward portion arranged to extend beside the animal's foreleg and its intermediate portion extended downwardly and rearwardly to give a milker access to the animal and a plate extending between and closing the space between the rear ends of the upper and lower bars beside the animal's rear leg, and means for connecting the rear end of the gate with the first-mentioned side of the frame, said means being adapted to pass around and restrain the animal's rear legs.

In testimony whereof I affix my signature.

JAMES F. GRIM. [L. S.]